US008949434B2

(12) United States Patent
Vellanki et al.

(10) Patent No.: US 8,949,434 B2
(45) Date of Patent: Feb. 3, 2015

(54) AUTOMATICALLY PROVISIONING A WWAN DEVICE

(75) Inventors: Vivekanand Vellanki, Hyderabad (IN); Ishtiyaq Ahmad Sheikh, Andhra Pradesh (IN)

(73) Assignee: Microsoft Corporation, Redmond, WA (US)

( * ) Notice: Subject to any disclaimer, the term of this patent is extended or adjusted under 35 U.S.C. 154(b) by 1180 days.

(21) Appl. No.: 12/002,494

(22) Filed: Dec. 17, 2007

(65) Prior Publication Data
US 2009/0158148 A1 Jun. 18, 2009

(51) Int. Cl.
| | | |
|---|---|---|
| G06F 15/16 | (2006.01) | |
| H04W 48/16 | (2009.01) | |
| H04L 12/24 | (2006.01) | |
| H04W 4/24 | (2009.01) | |
| H04W 8/26 | (2009.01) | |
| H04W 76/02 | (2009.01) | |
| H04W 84/04 | (2009.01) | |

(52) U.S. Cl.
CPC ........... *H04W 48/16* (2013.01); *H04L 41/0806* (2013.01); *H04W 4/24* (2013.01); *H04M 2215/2033* (2013.01); *H04W 8/26* (2013.01); *H04W 76/02* (2013.01); *H04W 84/04* (2013.01)
USPC ........... 709/227; 709/203; 709/217; 709/249; 709/250

(58) Field of Classification Search
USPC .................. 709/203, 217, 227, 249, 250, 238
See application file for complete search history.

(56) References Cited

U.S. PATENT DOCUMENTS

| | | | | |
|---|---|---|---|---|
| 5,870,546 | A | * | 2/1999 | Kirsch ........................... 709/205 |
| 5,958,016 | A | * | 9/1999 | Chang et al. ................... 709/229 |
| 5,999,825 | A | | 12/1999 | Geulen |
| 6,064,882 | A | | 5/2000 | Coyne et al. |

(Continued)

FOREIGN PATENT DOCUMENTS

| | | |
|---|---|---|
| CN | 1596405 | 3/2005 |
| GB | 2 369 273 A | 5/2002 |

(Continued)

OTHER PUBLICATIONS

GPRS Auto-Configuration in Wireless Wide Area Networks, 2003, http://www.microsoft.com/whdc/device/network/wireless/GPRS.mspx.

(Continued)

*Primary Examiner* — Michael Y Won
(74) *Attorney, Agent, or Firm* — John Jardine; Kate Drakos; Micky Minhas (57) ABSTRACT

Network connection information is requested by a wireless wide area network device via the internet. Such information may include configuration information, data roaming partner information, and/or cost information regarding roaming partner connection and/or a subscriber plan related to the wireless wide area network. To retrieve the information, the wireless device sends a request to a redirection server, which in turn provides an internet address for a provisioning server, or instructs a provisioning server to provide the network configuration information to the wireless device. A user and/or the wireless device may use the network connection information when deciding whether and/or how to connect to the network. A network provider may use methods disclosed herein to efficiently update wireless devices that subscribe to the network. The network provider may provide selected network connection information based on information regarding the wireless device, such as the user identification.

20 Claims, 6 Drawing Sheets

(56) References Cited

U.S. PATENT DOCUMENTS

| | | | |
|---|---|---|---|
| 6,081,705 A | 6/2000 | Houde et al. | |
| 6,269,101 B1 | 7/2001 | Gerszberg et al. | |
| 6,408,392 B2 | 6/2002 | White | |
| 6,496,689 B1 | 12/2002 | Keller et al. | |
| 6,510,323 B1 | 1/2003 | Stocker et al. | |
| 6,529,729 B1 | 3/2003 | Nodoushani et al. | |
| 6,556,817 B1 | 4/2003 | Souissi et al. | |
| 6,564,055 B1 | 5/2003 | Hronek | |
| 6,647,260 B2 | 11/2003 | Dusse et al. | |
| 6,754,708 B1* | 6/2004 | Sabatier et al. | 709/227 |
| 6,757,709 B1* | 6/2004 | Oberdorfer | 709/203 |
| 6,810,250 B2 | 10/2004 | Jo et al. | |
| 6,834,196 B1 | 12/2004 | Tarnanen et al. | |
| 6,973,490 B1* | 12/2005 | Robertson et al. | 709/224 |
| 7,031,704 B2 | 4/2006 | Di Claudio et al. | |
| 7,035,630 B2 | 4/2006 | Knowles | |
| 7,088,685 B2* | 8/2006 | Meyerson et al. | 370/260 |
| 7,155,219 B2 | 12/2006 | Aerrabotu | |
| 7,164,927 B1 | 1/2007 | Koch et al. | |
| 7,185,074 B2* | 2/2007 | Schacht et al. | 709/221 |
| 7,289,805 B2* | 10/2007 | Tom et al. | 455/432.1 |
| 7,363,354 B2* | 4/2008 | Lahti | 709/219 |
| 7,469,139 B2 | 12/2008 | Van de Groenendaal | |
| 7,505,756 B2 | 3/2009 | Bahl | |
| 7,526,762 B1* | 4/2009 | Astala et al. | 717/171 |
| 7,562,304 B2* | 7/2009 | Dixon et al. | 715/738 |
| 7,574,212 B2* | 8/2009 | McConnell et al. | 455/437 |
| 7,664,088 B2* | 2/2010 | Ko et al. | 370/338 |
| 7,702,752 B2* | 4/2010 | Kirsch et al. | 709/219 |
| 7,724,753 B2* | 5/2010 | Naqvi et al. | 370/410 |
| 7,809,785 B2* | 10/2010 | Appleton et al. | 709/201 |
| 7,885,222 B2* | 2/2011 | Cole | 370/328 |
| 8,073,931 B2* | 12/2011 | Dawes et al. | 709/219 |
| 8,238,238 B2* | 8/2012 | Baron et al. | 370/230 |
| 2002/0123335 A1 | 9/2002 | Luna | |
| 2002/0160789 A1 | 10/2002 | Berg | |
| 2003/0027581 A1 | 2/2003 | Jokinen et al. | |
| 2003/0108018 A1* | 6/2003 | Dujardin et al. | 370/338 |
| 2004/0014423 A1 | 1/2004 | Croome et al. | |
| 2004/0039822 A1* | 2/2004 | Bensimon | 709/227 |
| 2004/0158618 A1 | 8/2004 | Shaw | |
| 2004/0162105 A1 | 8/2004 | Reddy et al. | |
| 2004/0233930 A1* | 11/2004 | Colby, Jr. | 370/464 |
| 2005/0059393 A1 | 3/2005 | Knowles | |
| 2005/0083846 A1 | 4/2005 | Bahl | |
| 2005/0107100 A1 | 5/2005 | Gustafsson | |
| 2005/0125693 A1 | 6/2005 | Duplessis et al. | |
| 2005/0233693 A1 | 10/2005 | Karaoguz et al. | |
| 2005/0254655 A1 | 11/2005 | Foster et al. | |
| 2006/0025130 A1 | 2/2006 | Krishnamurthi et al. | |
| 2006/0094403 A1* | 5/2006 | Norefors et al. | 455/411 |
| 2006/0116507 A1 | 6/2006 | Oppermann et al. | |
| 2006/0229084 A1 | 10/2006 | Noldus et al. | |
| 2006/0236105 A1 | 10/2006 | Brok et al. | |
| 2006/0252425 A1 | 11/2006 | Jiang | |
| 2006/0291419 A1 | 12/2006 | McConnell | |
| 2007/0004403 A1 | 1/2007 | Silvestri | |
| 2007/0043681 A1 | 2/2007 | Morgan | |
| 2007/0072590 A1 | 3/2007 | Levitan | |
| 2007/0091845 A1 | 4/2007 | Brideglall | |
| 2007/0124481 A1* | 5/2007 | Bloebaum et al. | 709/227 |
| 2007/0133547 A1 | 6/2007 | Ko et al. | |
| 2007/0161375 A1 | 7/2007 | Danzeisen et al. | |
| 2007/0169093 A1* | 7/2007 | Logan et al. | 717/168 |
| 2007/0174131 A1 | 7/2007 | Mehta et al. | |
| 2007/0184833 A1 | 8/2007 | Xu et al. | |
| 2007/0202850 A1* | 8/2007 | Pantalone et al. | 455/412.1 |
| 2007/0233615 A1 | 10/2007 | Tumminaro | |
| 2008/0090586 A1 | 4/2008 | Engelhart | |
| 2008/0113665 A1* | 5/2008 | Paas et al. | 455/426.1 |
| 2008/0299971 A1 | 12/2008 | Cai et al. | |
| 2010/0087167 A1* | 4/2010 | Tsurutome et al. | 455/411 |
| 2011/0145359 A1* | 6/2011 | Quinn et al. | 709/217 |
| 2011/0296006 A1* | 12/2011 | Krishnaswamy et al. | 709/224 |

FOREIGN PATENT DOCUMENTS

| | | |
|---|---|---|
| JP | 02/11466 | 2/2002 |
| KR | 2006-0101934 A | 9/2006 |
| WO | WO 2005/109947 A1 | 11/2005 |
| WO | WO 2007/043753 A1 | 4/2007 |

OTHER PUBLICATIONS

Oommen, P., "A framework for integrated management of mobile-stations over-the-air," 2001 IEEE, Session Seven, Cellular Network Management, pp. 247-256; http://ieeexplore.ieee.org/ie15/7332/19847/00918035.pdf?isNumber=.

Houssos, N., "A VHE architecture for advanced value-added service provision in $3^{rd}$ generation mobile communication networks," Communication Networks Laboratory, Dept. of Informatics, Univ. of Athens,; http://citeseer.ist.psu.edu/cache/papers/cs/23863/http:zSzzSzcnl.di.uoa.grzSzpublicationszSzglobecom2000.pdf/houssos00vhe.pdf.

3GPP TS 23.090 V4.0.0, http://www.arib.or.jp/IMT-2000/V620May07/5_Appendix/Rel4/23/23090-400.pdf.

USSD Gateway, http://www.inswitch.us/assets/imagenes/vas/pdfs/ussd_gateway_pdf.pdf.

Cellular Assisted Heterogeneous Networking, http://www.iam.unibe.ch/~rvs/research/pub_files/Da06.pdf.

International Search Report dated Apr. 21, 2009, from corresponding International Application No. PCT/US2008/084619, filed Nov. 25, 2008.

Josefsson et al., "Protected EAP Protocol (PEAP) v2", draft-josefsson-pppext-eap-tis-eap-07.txt, Oct. 2003, http://www.ietf.org/internet-drafts/draft-josefsson-pppext-eap-tis-eap-07-.txt.

Motorola, Avaya & Proxim Agree to Solve WLAN-WWAN Roaming Issues http://www.mobileinfo.com/News.sub.--2003/Issue03/WLAN.sub.--Trio.htm.

CN Notice on the First Office Action for Application No. 200880122145.1, Jul. 20, 2012.

Josefsson et al., "Protected EAP Protocol (PEAP) v2", draft-josefsson-pppext-eap-tis-eap-07.txt, Oct. 2003, http://www.ietf.org/internet-drafts/draft-josefsson-pppext-eap-tis-eap-07-.txt.

Overview of GPRS, from Cisco IOS Mobile Wireless Configuration Guide, 2001,** http://www.cisco.com/univercd/cc/td/doc/product/software/ios122/122cgcr/f-mwirec/mwcfprt1/mwcfgpov.htm.

Roger Kalden, Ingo Meirick, and Michael Meyer, "Wireless Internet Access Based on GPRS", Ericsson Research, Ericsson Eurolab Deutschland, IEEE Personal Communications, Apr. 2000 pp. 8-18.

Buckley et al., EAP SIM GMM Authentication, http://www.ietf.org/internet-drafts/draft-buckley-pppext-eap-sim-gmm-00.txt Aug. 2002.

Song, SIP server IPCP configuration option for PPP, http://www.ietf.org/internet-drafts/draft-song-pppext-sip-support-01.txt Apr. 2003.

Heckmanns et al., Design and Evaluation of 3G Security, ACTS Mobile Summit, Oct. 2000.

Motorola, Avaya & Proxim Agree to Solve WLAN-WWAN Roaming Issues http://www.mobileinfo.com/News.sub.--2003/Issue03/WLAN.sub.--Trio.htm Jan. 2003.

Yonker et al., Merging WLAN, WWAN Radios in Mobile Designs, CommsDesign.com, Jun. 19, 2002; URL: http://www.commsdesign.com/story/OEG20020619S0016.

Nokia, WLAN Identity Privacy with Cryptographic Temporary Identifiers, 3GPP TSG WG3 Security, Nov. 2002 http://www.3gpp.org/ftp/tsg.sub.--sa/WG3.sub.--Security/2002.sub.--meetin-gs/TSGS3.sub.--26.sub.--Oxford/Docs/PDF/S3-020624.pdf.

Gellens, Wireless Device Configuration (OTASP/OTAPA) via ACAP, Jul. 1999, http://www.ietf.org/rfc/rfc2636.txt?number=2636.

Over the Air Service Provisioning, Logica White Paper 1.0, Feb. 2000, http://www.totaltele.com/whitepaper/docs/Logica.sub.--whitepaperota.pdf.

R. Enns, XMLCONF configuration protocol, Aug. 2003, http://www.watersprings.org/pub/id/draft-enns-xmlconf-spec-00.txt.

JP Notice of Rejection for Application No. 2010-538036, Dec. 26, 2012.

CN Notice on the Third Office Action for Application No. 200880122145.1, Apr. 22, 2013.

(56) References Cited

OTHER PUBLICATIONS

CN Notice on the Fourth Office Action and Search Report for Application No. 200880122145.1, Sep. 26, 2013.
CN Decision on Rejection for Application No. 200880122145.1, Nov. 5, 2013.
"Cisco IOS Mobile Wireless Configuration Guide", Release 12.2, Cisco Systems, Inc., 2001.
"Overview of GPRS", Cisco IOS Mobile Wireless Configuration Guide, Release 12.2, Cisco Systems, Inc., 2001.
Buckley, "EAP SIM GMM Authentication", Aug. 2002.
Song, "SIP server IPCP configuration option for PPP", Apr. 2003.
Gellens, "Wireless Device Configuration (OTASP/OTAPA) via ACAP", Jul. 1999.
EP Communication for Application No. 08862264.2-853/2223559 PCT/US2008084619, Reference FB23076, Jul. 1, 2014.

* cited by examiner

AUTOMATICALLY PROVISIONING A WWAN DEVICE

BACKGROUND

Wireless Wide Area Networks (WWANs) are operated by cellular/mobile phone network operators, and the WWANs enable devices to communicate wirelessly over broad areas with other devices or networks. For example, a mobile phone network operator, which operates a mobile phone network that allows mobile phones (or other mobile devices) equipped to send and/or receive voice, may use that network to provide data services to mobile devices using wireless communications. Because of the nearly ubiquitous nature of the mobile phone network, the mobile phone network can provide a WWAN.

A wireless device is typically associated with a home network operator and, when available, uses the home network for wireless communications. The home network operator may have partner network operators that provide roaming service to the wireless device. That is, the roaming network operators permit the wireless device to connect to the home network via the roaming network when the wireless device is outside of the device's home network's coverage area. A user may desire certain information (such as cost) as an aid to deciding whether to connect to a roaming network, and/or as an aid to deciding to which roaming network to connect. In many cases, the wireless device may be programmed with the identity of one or more voice roaming partner operators of its home operator so that a partner voice roaming network operator can be located when the wireless device is outside of the home network's coverage.

Typically, to establish a data connection with a home WWAN, a wireless device needs to have certain information. For example, a wireless device may possess a set of configuration parameters such as an access point name, a username, and a password for establishing a connection with a WWAN.

Before a connection can be made to WWAN for the first time, the configuration parameters (e.g., access point name, username, password) are typically either manually entered by a user who obtains the information by calling a customer service center, or are installed using configuration software.

SUMMARY OF INVENTION

To expand the utility and ease of use of wireless devices, the internet may be used to obtain network connection information by a wireless device. Such information may include configuration information, data roaming partner information, and/or cost information associated with a data subscriber plan and/or connection to the network of a data roaming partner.

In some embodiments, the network connection information is obtained from a provisioning server operated by a WWAN network operator. To locate the provisioning server for a particular network, the wireless device queries a redirection server at a well-known URL address. The redirection server sends location information regarding the provisioning server, such as a URL address, to the wireless device, which is then able to request network connection information directly from the provisioning server. The well-known URL address may be stored on the wireless device, such as in the operating system or on a WWAN data card.

In an alternative embodiment, the wireless device sends a request for network connection information to the redirection server, and the redirection server then instructs the provisioning server to provide the requested network connection information to the wireless device. In this manner, the wireless device sends a request via an intermediary device, which in this case is the redirection server.

In another embodiment, the wireless device, such as a Personal Digital Assistant (PDA), sends a request for network connection information to a provisioning server via an intermediary device which is connected to the internet, such as a personal computer, and receives the requested network connection information from the provisioning server via the computer. Such an arrangement may be useful when the wireless device attempts to connect with a particular wireless network operator for the first time and the wireless device desires to retrieve configuration information.

Configuration information includes information used to enable a wireless device to connect to the WWAN. The first time a wireless device attempts to connect with a particular wireless network operator, the wireless device may need an access point name, a username and a password for the home network. As one example of a method of obtaining the configuration information, the wireless device, such as a PDA, sends a request for configuration information to an intermediary device, such as a personal computer (either wirelessly or with a wire connection). The personal computer either has the URL for a network provisioning server saved locally, or the personal computer queries a redirection server for the URL, and the personal computer sends the request to the provisioning server via the internet. In response, the provisioning server sends the configuration information to the personal computer which passes the information along to the wireless device. With the configuration information, the PDA then is able to automatically connect to the network for data and/or voice services over the WWAN.

In an alternative to the embodiment described immediately above, when the personal computer receives the request for configuration information, the personal computer may contact another intermediary device, such as a redirection server, which then instructs the provisioning server to send the information to the personal computer, which in turn forwards the information to the PDA.

In other embodiments, configuration information needed to establish a WWAN connection may be requested and/or obtained by the wireless device without use of an intermediary device. For example, the wireless device may send requests and/or receive configuration information via a WiFi network that is separate from the WWAN to which the wireless device is attempting to connect. In still other embodiments, any other suitable method of communication between the wireless device and the provisioning server may be employed to transmit requests for information and to receive information, such as the use of Short Message Service (SMS) messages.

By automatically transmitting network connection information to a wireless device, for initial connections, or in cases where information changes due to changes on the network operator's side, the burden on both the user and the network operator is reduced, and the rate of errors in obtaining the information is reduced. In some cases, the user can make better informed choices as to network use, and the network operator may maintain better and more efficient control of information distribution.

Other types of network connection information that may be requested and/or transmitted via the internet include, but are not limited to: identifications of data roaming partner network operators; and characteristics of a network subscriber plan, such as use limits or charge structure. The characteristics of a network subscriber plan also may include statistics regarding use of the network as part of the subscriber plan.

One or more of the above types of network connection information may be used as an aid to selecting a roaming network operator, deciding whether to connect to a network, deciding what services to use over the network, and/or other decisions.

The home network provider and/or a third party may provide network connection information to a wireless device, and the specific information to be provided may be determined in response to a wireless device's unique identifier.

The advantages and benefits described herein are not necessarily intended to be limiting, and some or all of the advantages and benefits do not necessarily need to achieved or implemented for various embodiments to fall within the scope of the invention.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have appreciated that user experiences with accessing WWANs may be improved by providing an internet-based mechanism for the acquisition of certain information related to data network connection and use. More specifically, data network connection information may be obtained via the internet, which may improve the ability of a wireless device to connect to a WWAN, and may inform decision-making, such as which network operator to use, whether to proceed with a connection, and which plan to use from a given network provider. This information may be displayed and used for decision-making by a user or may be used in an automated fashion within a configuration manager or other component of device to select, create or manage a connection over a WWAN. Additionally, systems and methods disclosed herein may improve a network operator's ability to provide updated information to a wireless device client quickly and easily.

In accordance with aspects of the invention, certain network connection information related to a WWAN may be requested, provided and/or obtained over the internet. The use of the internet may provide real time communication between the wireless device and the network operator, even if the wireless device is outside the home network's range, or even outside the range of any WWAN.

Figure 1:
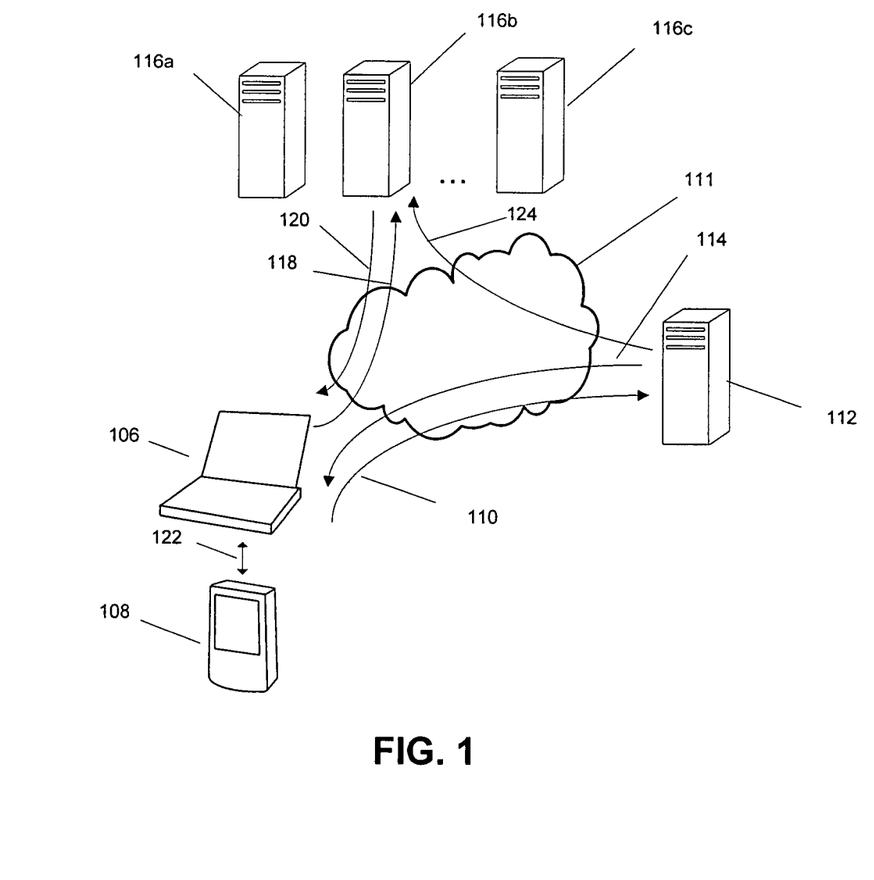
FIG. 1 is a diagram illustrating an example of an environment in which network connection information may be obtained and/or provided via the internet.

According to one aspect of the invention, a wireless wide area network device such as a laptop computer 106 or a personal digital assistant 108 sends a query 110 via the internet 111 to a redirection server 112 for a URL address of a provisioning server that is operated by the network operator of the WWAN to which the wireless device is either connected or attempting to connect. Redirection server 112 may be accessible via a well-known internet address. In response, redirection server 112 sends information 114 regarding a URL for a provisioning server 116b from among a plurality of provisioning servers 116a, 116b . . . 116n. The wireless device sends a request 118 for network connection information to provisioning server 116b via the internet 111. In response, provisioning server 116b sends the requested network connection information 120 to the wireless device. The network connection information also may be sent via the internet 111, or may be sent via another suitable channel, such as via one or more SMS messages.

In an alternative embodiment, the wireless device sends a request for network connection information to the redirection server, and the redirection server then sends instructions 124 to provisioning server 116b to provide the requested network connection information 120 to the wireless device. In this manner, the wireless device sends a request via an intermediary device, in this case redirection server 112.

In some cases, for example when the wireless device cannot connect to the internet via a WWAN, the wireless device can request and obtain network connection information (such as configuration information) through a wired internet connection or a wireless internet connection other than a WWAN connection (e.g., WiFi). This connection to the internet may be made directly from the wireless device, or may be made via a connection 122 to an intermediary device, such as computer 106.

Provisioning server 116b may be implemented in any suitable way. For example, it could be a dedicated server for handling requests for network connection information, or it may be an existing general purpose server with a provisioning service module.

Figure 2:
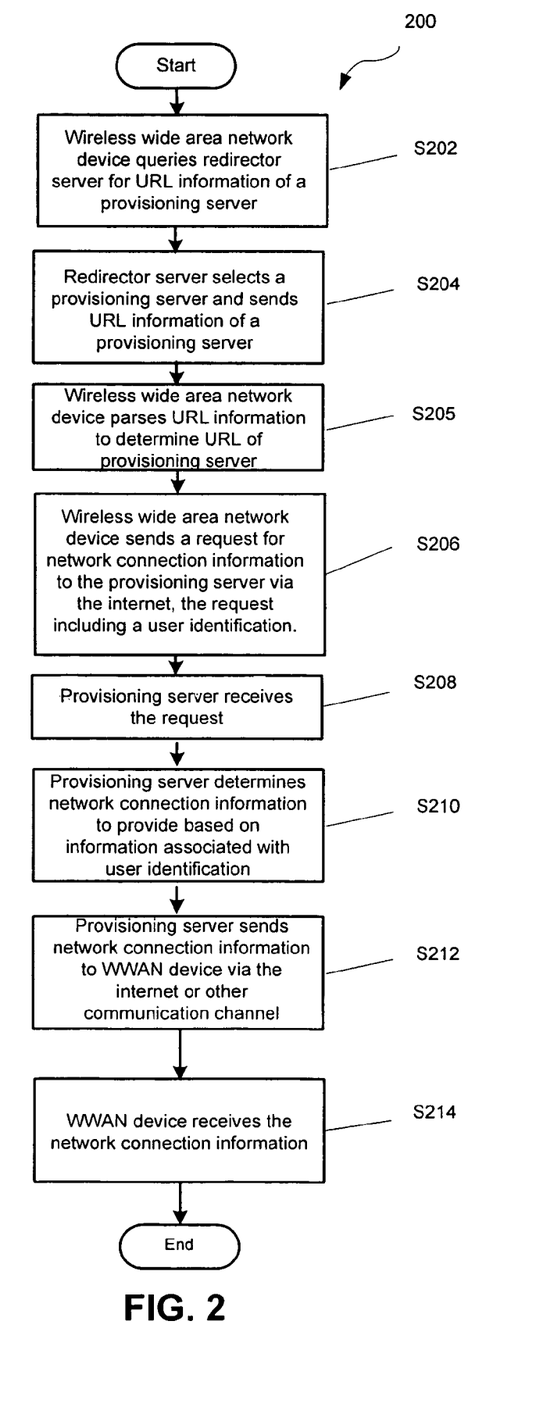
FIG. 2 is a flowchart illustrating an example of a method of obtaining information for a wireless wide area network device using some embodiments of this invention.

FIG. 2 shows a flowchart of a method 200 of obtaining network connection information for a wireless wide area network device. In an act S202, a wireless wide area network device queries a redirection server for URL information of a provisioning server. The redirection server may be queried at a well-known internet address and the redirection server may select a provisioning server from among a plurality of provisioning servers. Though each network operator may have one or more provisioning servers, in some embodiments, only one provisioning server may exist for selection. In an act S204, the redirection server selects a provisioning server and sends associated URL information to the wireless device. The provisioning server may be hosted by the WWAN operator, or may be hosted by a third party that is provided with the relevant information by the WWAN operator.

In an act S205, the wireless device parses the URL information received from redirection server and determines the URL for the provisioning server.

In an act S206, a wireless wide area network device sends a request for network connection information to the provisioning server based on information from S205. The request includes a user identification, and the request is adapted for transmission via the internet to a provisioning server. The request includes elements defining a request for connection information, and the request may comprise a web service request or other suitable request for services. In an act S208, the provisioning server receives the request. In an act S210, the provisioning server determines what network connection information to provide based on information associated with the user identification. For example, the provisioning server may determine what username and password to provide based on the type of subscriber plan (e.g., broadband or GPRS/EDGE).

In an act S212, the provisioning server sends the network connection information to the WWAN device. The network connection information may be adapted for transmission via the internet or may be adapted for transmission via another suitable communication channel.

In an act S214, the WWAN device receives the network connection information from the provisioning server via the internet or other suitable communication channel. In some embodiments, the network connection information may include one or more of: configuration information (such as a username and password); an identification of one or more data roaming networks approved for use; cost information regarding a data subscriber plan associated with the wireless wide area network device; and cost information associated with connecting to the one or more approved data roaming networks. In some embodiments, the network connection information may include data subscriber plan information such as details of the type of connection (e.g., broadband or GPRS/EDGE) that the user subscribes to, or may include statistical information regarding usage rates (e.g., amount of data downloaded or time spent connected to the network). Such information facilitates selecting a connection or connection options and/or forming a connection to a wireless network and/or managing the connection once established.

As a result of automatically obtaining the configuration information via the internet, human input errors are reduced when compared to one conventional method of having the user call the network operator's customer service center and then manually enter the information. In cases where the user re-installs an operating system, for example on a laptop computer having wireless capabilities, providing the configuration information over the internet may eliminate the need to manually re-enter the information or re-install wireless communication software after the operating system re-installation. If the network operator changes any one of the access point name, the username, or the password, each wireless device client may need to be updated, and methods and systems disclosed herein can aid in updating this information on the wireless device clients. An update operation may be triggered in response to any suitable stimulus, including the passage of time or the inability to connect to the WWAN.

Aspects of the invention may be implemented in connection with various types of WWANs, such as CDMA and WiMax wireless networks as only two examples of many types of WWANs.

Home network operators typically have approved partner roaming network operators so that wireless devices can initiate or maintain a connection outside of the home network's coverage area. Identifications of approved voice roaming partner networks are often provided to wireless devices and updated via a signaling channel of the WWAN in order to facilitate discovering suitable roaming voice networks. The inventors have appreciated that even though wireless devices may have access to a list or other identification of approved voice roaming partners and/or have access to an identification of available data roaming providers, the user may not have access to an identification of approved data roaming partners. Without this information, a user may try to connect to a data network that is not provided by an approved partner, and find that a connection is not possible. Or, in some cases, a connection is made to a data network that is not provided by an approved partner, but the cost of connection is higher than connecting with the network of an approved provider.

Figure 3:
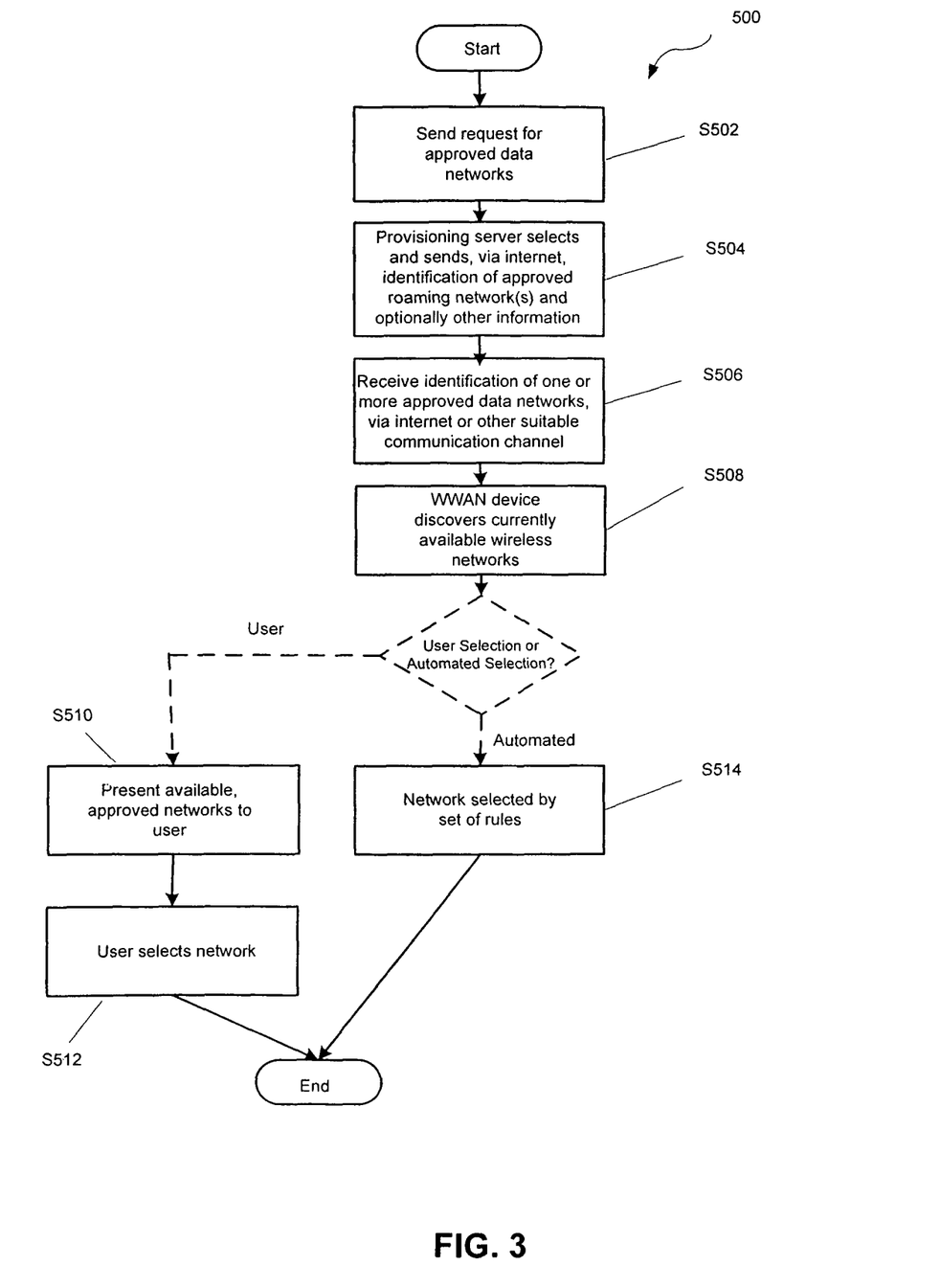
FIG. 3 is a flow chart of a method of selecting a network with which to initiate connectivity.

FIG. 3 shows a flowchart of a method 500 of selecting a data network when a wireless device is outside of a home network's coverage area. As part of the method, an identification of one or more approved roaming data network operators is received via the internet.

In an act S502 of method 500, a wireless device sends a request, via the internet, to a provisioning server for an identification (e.g., a list) of one or more approved roaming data network operators. A user identification may be included in the request, for example, an international mobile subscriber identity (IMSI). The provisioning server selects and sends the approved roaming data network information to the WWAN device in an act S504. The selection of the information may be based on the user identification and/or other information included in the request. In some cases, the provisioning server may provide one or more of: a roaming partner identification, a roaming partner name, and information regarding potential costs to be incurred by the user if an identified roaming partner is selected. In the case of information regarding potential costs, the information sent to the WWAN may be based on the user's subscription plan. The information may be sent to the WWAN device via the internet or via another suitable communication channel. In an act S506, the wireless device receives the information selected and sent by the provisioning server.

In an act S508, the wireless device discovers wireless data networks that are available based on signal strength. The wireless device may search for all available wireless data networks, and then limit the choices based on the list of approved data networks. Or, in some embodiments, the wireless device may start with the list of approved data networks and check the signal strength of each approved data network to verify its availability.

In some embodiments, when multiple data networks are available, the selection of which data network to connect with may be performed by the user. In such embodiments, a device connection manager may present the available, approved data networks to the user in an act S510, optionally with additional information such as signal strength, connection speed, and cost information. The user then selects a data network in an act S512.

In some embodiments, the wireless device selects which network operator to use based on a set of rules in an act S514. For example, the identification of approved network operators received from the home network operator may include a hierarchy of approved network operators, and the wireless device may select the available network operator having the highest rank. In other embodiments, a connection manager may include an algorithm which selects a network operator based on additional factors such as cost or other factors. Information to evaluate these rules also may be transmitted over the internet.

Figure 4:
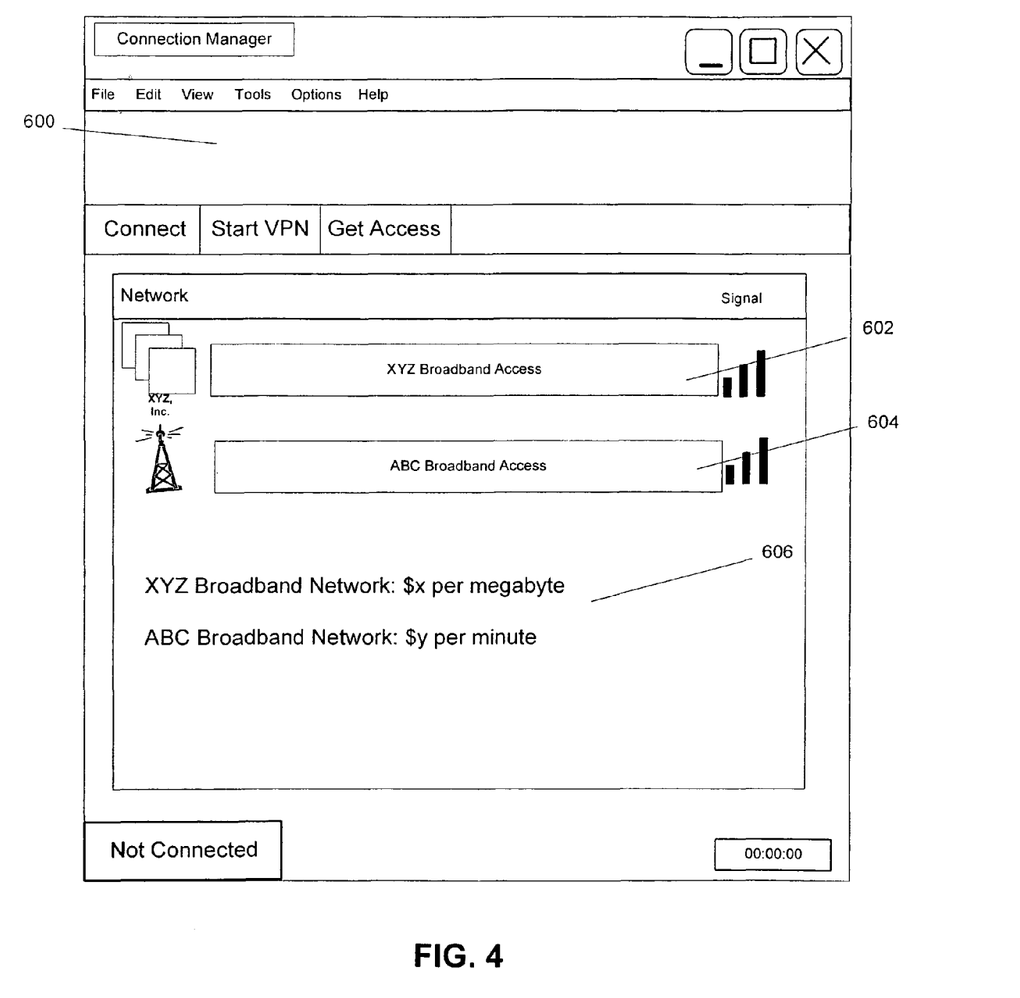
FIG. 4 is an example of a user interface of a connection manager showing network options and cost information.

One example of a user interface 600 presenting roaming data network options 602, 604 to a user is shown in FIG. 4 to allow for selection of a roaming network operator. As discussed above, optional information regarding cost 606 and/or other data subscriber plan information may presented as part of the presentation to the user.

Discovering the characteristics of a user's network subscriber plan can allow the user and/or connection management software to make informed decisions regarding use of the network, for instance, whether to proceed with further use of the network.

According to one aspect of the invention, to obtain network connection information for the first time for a WWAN device, the following steps may be performed. First, a user purchases a WWAN data card. An address of a server than can act as a redirection server (i.e., a well-known server) may be stored in a computer-readable medium on the data card. The data card is inserted into the WWAN device and the driver is installed from either an operating system update or from a CD-ROM or other computer-readable medium containing the driver. The user may be prompted to determine whether the user will provide the network connection information or whether the device will obtain the information automatically. If the WWAN device is not connected to the internet, the user may be prompted to connect to the internet. Once connected to the internet, the WWAN device queries the redirection server (using the well-known address stored in the data card) for the internet address of a provisioning server (or other implementation of a network operator's web service interface). The WWAN device sends a request to the provisioning server via the internet and in response receives network connection information.

In some embodiments, the address for the redirection server may be stored in an operating system of the wireless device. The redirection server address also may be stored in the driver for the data card. The wireless device may permit manual entry of the redirection server address, and the address information may be provided in an e-mail, on paper, or over the telephone.

Figure 5:
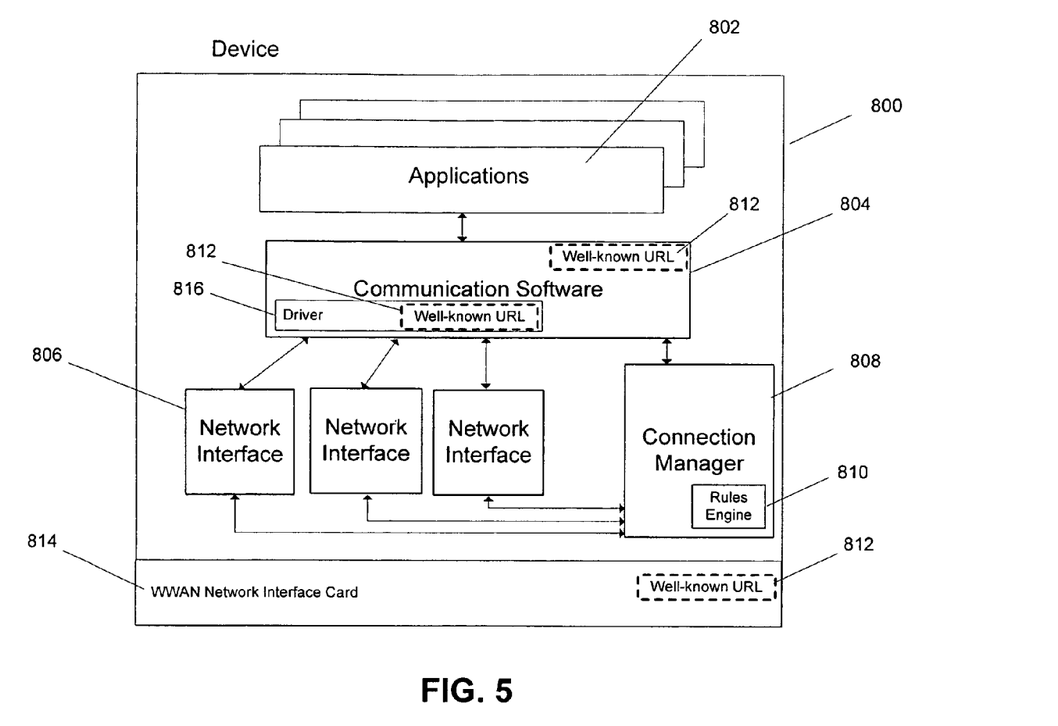
FIG. 5 is a block diagram of a wireless device according to one embodiment of the invention.

FIG. 5 shows one embodiment of an architecture 800 of portions of a wireless device including various modules, which may be implemented as software modules. One or more applications 802 may run on the device. A communication software module 804 connects applications 802 to one or more network interfaces 806 and to a connection manager 808. Network interfaces 806 may communicate with data networks and/or voice networks. Connection manager 808 may be implemented in any suitable way. For example, it could be a discrete software module dedicated to managing the connection of the device to networks, or it could be a number of modules dispersed throughout the device, which in combination serve to manage connection of the device to networks. Connection manager 808 may include a rules engine 810 that is configured to determine actions to be taken in response to received network connection information. Rules engine 810 may be updated with data and/or rules via information received over the internet.

As shown in FIG. 5, a URL address 812 may be stored within one or more of a WWAN network interface card 814, a driver 816, communication software module 804, an operating system (not shown), or any other suitable location. According to one aspect of the invention, by having the URL address for the redirection server stored on the wireless device, the requesting and receiving of network connection information may be seamless and automatic even when attempting to connect to a WWAN for the first time.

When a network operator changes/updates network connection information, the operator may need to update the information on client devices. One or more of several methods may be employed to achieve such an update. In a first method, the network operator notifies a user, such as by sending an SMS message to the user, and in response, the user initiates an update of the network configuration via the internet. In a second method, the network operator sends a configuration SMS message which serves to both notify and provided updated information. The WWAN device parses the message and initiates an update of the configuration via the internet. In a third method, periodic checks may be made by the WWAN device as to whether any change in network connection information has occurred, and if a change has occurred, the WWAN device is notified. The periodic checks may be programmed to occur after a certain period of time, or may occur every time the WWAN device connects to the internet.

Figure 6:
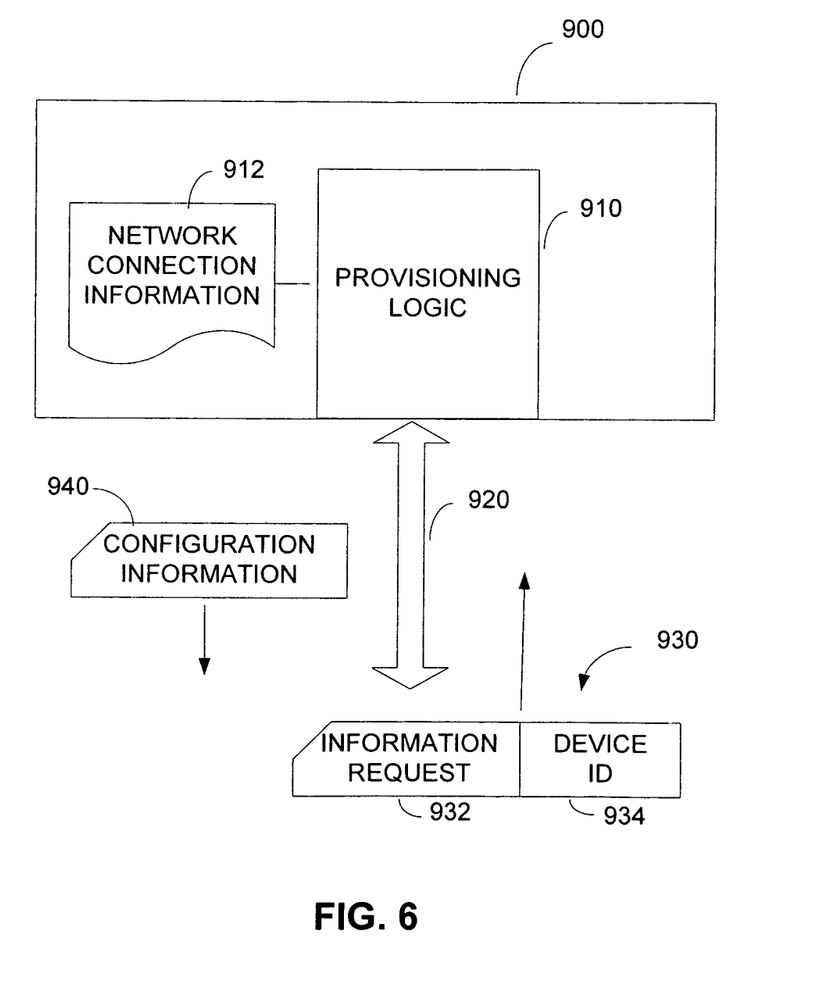
FIG. 6 is a block diagram of a provisioning server according to an embodiment of the invention.

FIG. 6 shows one embodiment a provisioning server 900 including various modules, which may be implemented as software modules. Provisioning server 900 may be operated by a data service provider to provide information related to that data service. For example, provisioning server 900 may be operated by a cellular telephone network operator that also provides optional data services to subscribers.

In the embodiment illustrated, provisioning server 900 is connected to the internet 920. Provisioning logic 910 receives information over the internet 920. For example, that information could be in the form of a web service request 930 sent via the internet by a wireless device seeking to connect to a data service Web service request 930 may include one or more fields. In the embodiment of FIG. 6, request 930 includes fields 932 and 934. Field 932 contains a value identifying the request as a request for configuration information.

Field 934 may contain information identifying the wireless device or a user of that device. The information may identify the device using a device ID typically used in WWAN devices, such as an IMSI or another identifier, such as a cellular telephone number. Alternatively or additionally, field 934 may contain user or device authentication information assigned by a network or other information that may be programmed into a wireless device accessing a network. However, any suitable type and source of identification information may be used. For purposes herein, the term "user identification" is meant to include, among other identifications, a device identification such as an IMSI.

Regardless of the specific information in message 930, provisioning logic 920 may use that information to identify network connection information from a store 912 of network connection information. In this embodiment, store 912 may be one or more databases or other data structures storing one or more types of network connection information. The information may be stored based on the identity of either a user or device, allowing provisioning logic 910 to select network connection information based on the value in field 934. For example, store 912 may contain information about service plans subscribed to by users. Provisioning logic 910 may then access store 912 to provide network connection information specific to a user or a device.

It should be appreciated that the invention is not limited to executing on any particular system or group of systems. Also, it should be appreciated that the invention is not limited to any particular distributed architecture, network, or communication protocol, unless specifically recited in the claims.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Particular implementation details of computer systems that may execute aspects of the invention will now be described. These implementation details are provided by way of example only, and the invention is not limited to any particular implementation.

Various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

Methods described herein, acts thereof and various embodiments and variations of these methods and acts, individually or in combination, may be defined by computer-readable messages tangibly embodied on or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Computer-readable messages embodied on one or more computer-readable media may define instructions, for example, as part of one or more programs that, as a result of being executed by a computer, instruct the computer to perform one or more of the functions described herein, and/or various embodiments, variations and combinations thereof. The computer-readable media on which such instructions are embodied may reside on one or more of the components of any of systems described herein, may be distributed across one or more of such components, and may be in transition therebetween. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

The computer-readable media may be transportable such that the instructions stored thereon can be loaded onto any suitable computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Various embodiments according to the invention may be implemented on one or more computer systems. For example, various aspects of the invention may be implemented as specialized software executing in a general-purpose computer system, for example, on wireless device 106 or 108 and/or a peripheral device. The computer system may include a processor connected to one or more memory devices, such as a disk drive, memory, or other device for storing data. Memory is typically used for storing programs and data during operation of the computer system. Components of the computer system may be coupled by an interconnection mechanism, which may include one or more busses (e.g., between components that are integrated within a same machine) and/or a network (e.g., between components that reside on separate discrete machines). The interconnection mechanism enables communications (e.g., data, instructions) to be exchanged between system components. The computer system also may include one or more input devices, for example, a keyboard, mouse, trackball, microphone, touch screen, or digitizing tablet and one or more output devices, for example, a printing device, display screen, speaker. In addition, the computer system may contain one or more interfaces that connect the computer system to a communication network (in addition or as an alternative to the interconnection mechanism.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a PDA, a smart phone or any other suitable portable or fixed electronic device.

Having now described some embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. The foregoing description and drawings are by way of example only. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. The use of "including," "comprising," or "having," "containing," "involving," and variations thereof herein, is meant to encompass the items listed thereafter and equivalents thereof as well as additional items.

What is claimed is:

1. A method of obtaining network connection information that is configured for use in enabling a computing device to connect to an available wireless wide area network, the method comprising:

sending, by the computing device to a provisioning server, a request for the network connection information, the sent request comprising a user identification and at least one element defining the request as for the network connection information; and receiving, by the computing device from the provisioning server in response to the sending, the requested network connection information having been selected from among network connection information for each of a plurality of available wireless wide area networks, the selecting based on information included in the request, the received network connection information having been further selected based on the sent user identification, where the received network connection information is configured for facilitating a selection of options for a connection between the computing device and the available wireless wide area network, and is further configured for managing the connection once established.

2. The method of claim 1, further comprising:
sending a request to a redirection server for information regarding a URL for the provisioning server;
receiving the information regarding the URL for the provisioning server; and
determining the URL for the provisioning server, where the sending the request comprises sending the request to the determined URL.

3. The method of claim 2, further comprising obtaining the URL for the redirection server from an operating system of the computing device.

4. The method of claim 1, further comprising:
receiving a notification that at least a portion of the network connection information has been changed; and
receiving updated network connection information from the provisioning server.

5. The method of claim 4, wherein receiving the notification comprises receiving an SMS message.

6. The method of claim 1, where the sending the request comprises sending the request via an intermediary device.

7. The method of claim 6, wherein the intermediary device comprises a redirection server.

8. The method of claim 6, wherein the intermediary device comprises a computing device connected to the internet.

9. The method of claim 1, wherein receiving the network connection information from the provisioning server comprises receiving the network connection information from an intermediary device that received the network connection information from the provisioning server.

10. The method of claim 1, wherein the network connection information is configured to include:
configuration information for each of a plurality of available wireless wide area networks;
an identification of a plurality of available wireless data roaming networks approved for use;
and cost information for each of a plurality of available data roaming networks regarding costs to be incurred for selecting each of the plurality of available wireless data roaming networks.

11. The method of claim 1, wherein the network connection information comprises an identification of a plurality of available wireless data roaming networks approved for use, and the method further comprises selectively initiating a connection with one of the approved wireless data roaming networks.

12. The method of claim 1, where the receiving the network connection information occurs prior to connection of the computing device to the available wireless wide area networks.

13. The method of claim 1 where the received network connection information comprises a user name and password.

14. The method of claim 1 where the received network connection information comprises an identification of a data roaming network that is approved for use.

15. The method of claim 1 where the received network connection information comprises data subscriber plan cost information.

16. The method of claim 1 where the received network connection information comprises data roaming cost information.

17. The method of claim 1 where the received network connection information comprises details of a type of connection.

18. At least one computer-readable storage device storing computer-readable instructions that, when executed by a computing device, cause the computing device to perform actions comprising:
sending, by the computing device, a request for information regarding a provisioning server;
receiving the requested information regarding the provisioning server;
sending, by the computing device to the provisioning server based on the received information, another request for network connection information that is configured for use in enabling the computing device to connect to an available wireless wide area network, the sent another request comprising a user identification and at least one element defining the request as for the network connection information;
receiving, by the computing device from the provisioning server in response to the sending the another request, the requested network connection information, the received network connection information comprising:
configuration information for each of a plurality of available wireless data roaming networks;
an identification of a plurality of wireless data roaming networks approved for use; and
cost information for each of the plurality of available wireless data roaming networks regarding costs associated with selecting each of the plurality of available wireless data roaming networks; and
where the received network connection information is configured for facilitating a selection of options for a connection between the computing device and the available wireless wide area network, and further configured for managing the connection once established.

19. The computer-readable storage device of claim 18, where the received network connection information comprises cost information for each of the plurality of available wireless data roaming networks, the cost information regarding costs associated with selecting the each of the plurality of available wireless data roaming networks for connection by the computing device, the actions further comprising:
displaying the cost information on a user interface; and
requesting user input regarding selection of a wireless data roaming network from among the plurality of available wireless data roaming networks.

20. At least one computer-readable storage device storing computer-readable instructions that, when executed by a computing device, cause the computing device to perform actions comprising:
receiving a request from a device, the request for network connection information for an available wireless wide area network, where the network connection information is configured for use in enabling the requesting device to connect to the available wireless wide area network; and at least one of (a) or (b):
- (a) sending information regarding a provisioning server to the requesting device, the provisioning server being configured to receive the request for network connection information, further being configured to select the network connection information from a store of network connection information for the available wireless wide area networks based on an identification provided by the requesting device, and further being configured to send the selected network connection information to the requesting device; and
- (b) sending, to the provisioning server, information from the request and instructing the provisioning server to select the requested network connection information from the store of network connection information for the available wireless wide area networks based on the identification, and instructing the provisioning server to send the selected network connection information to the requesting device; and where the sent network connection information is configured for facilitating a selection of options for a connection between the requesting device and the available wireless wide area network, and is further configured for managing the connection once established.

\* \* \* \* \*